June 19, 1928.

I. W. NONNEMAN 1,674,372

TOOL FOR GROOVING PIPE

Filed Jan. 13, 1927  2 Sheets-Sheet 1

Inventor

Ira W. Nonneman,

By Bates, Macklin, Golrick & Tears

Attorneys

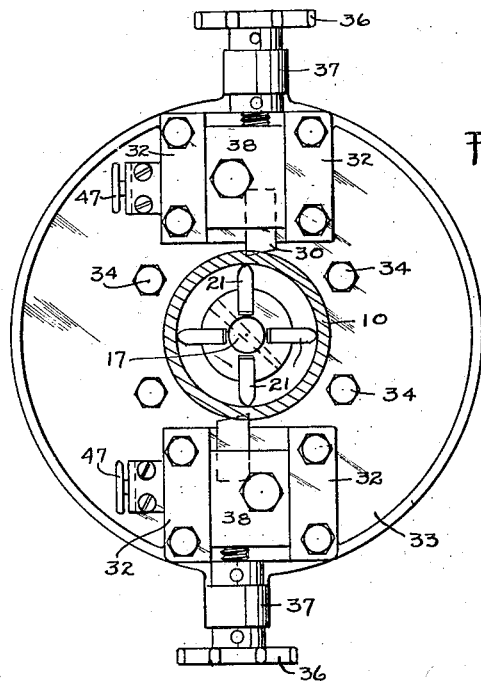
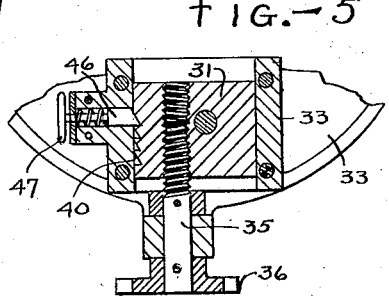
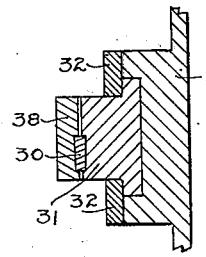
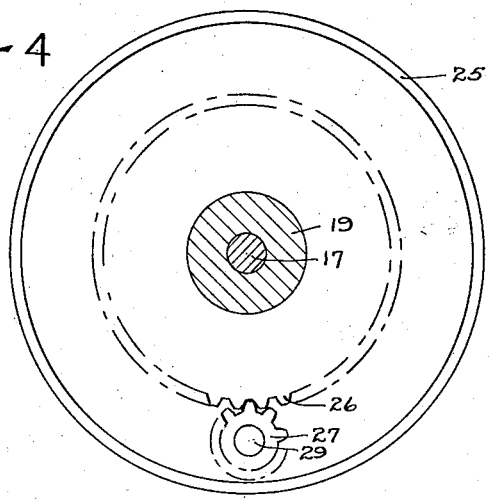

Patented June 19, 1928.

1,674,372

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

TOOL FOR GROOVING PIPE.

Application filed January 13, 1927. Serial No. 160,929.

This invention relates to metal working machines and more particularly to a hand operating machine which is used for cutting annular grooves in the outer surface of a pipe. One use for such grooves is to permit the cooperating members of a pipe coupling to be rigidly attached to the adjacent ends of the pipes to be joined.

An object of the present invention is to make a machine which can be readily operated by hand to cut such a peripheral annular groove in a pipe, and yet will have sufficient power for enabling the cutting operation to be effectively accomplished without necessitating unusual or extraordinary exertion by the operator. Still another object is to make a machine which can be readily adjusted to various sizes of pipes within a given range.

Figure 1:
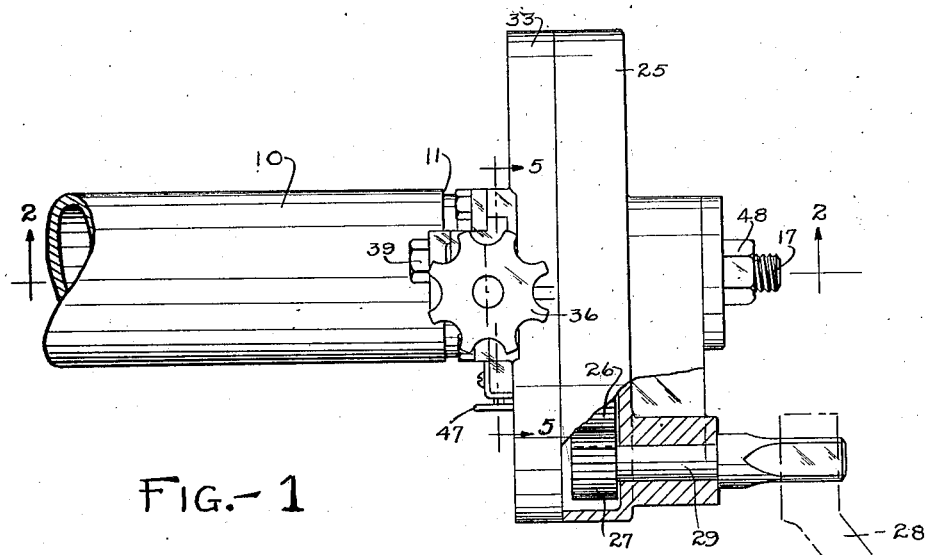
Figure 2:
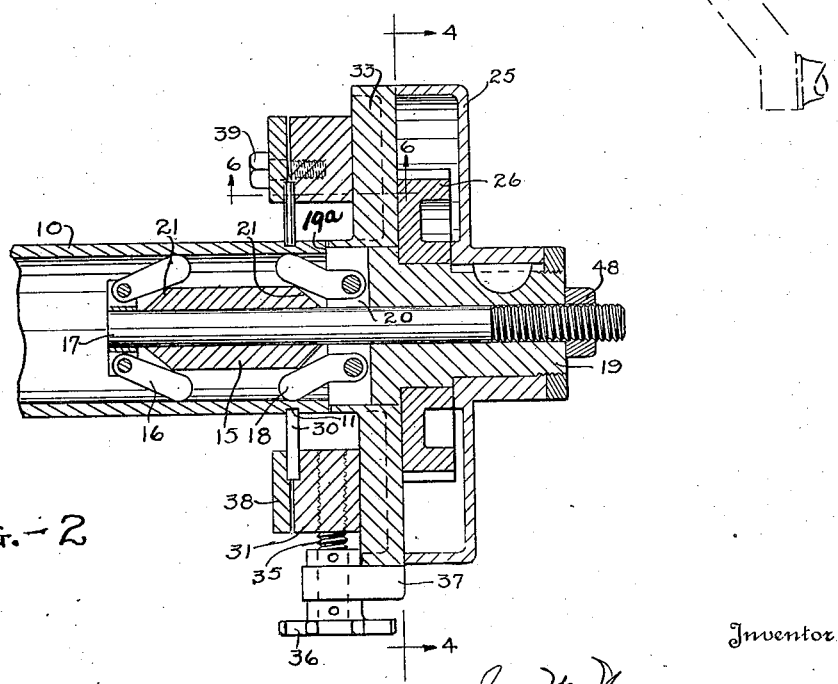

A machine embodying my invention is illustrated in side elevation and partly in section in Fig. 1; Fig. 2 is a vertical longitudinal section through the machine on a plane indicated by the line 2—2 in Fig. 1; Figs. 3 and 4 are sections taken on planes indicated by the correspondingly numbered lines in Fig. 2; Fig. 5 is a section on an enlarged scale on a plane indicated by the line 5—5 in Fig. 1; while Fig. 6 is a section taken on a plane indicated by the line 6—6 in Fig. 2.

In the drawings 10 indicates a pipe in which an annular groove 11 is shown as being cut by a machine embodying my invention. The machine is shown as being mounted on the end of the pipe and as having a clamping device which extends into the pipe, and makes a rigid connection therewith. More particularly, the clamping device comprises two sets of jaws which are disposed beyond the ends of a clamping block 15. One of such sets of jaws embodies four members 16 which are pivotally mounted upon the end of a spindle 17. The other set of jaws comprises members 18 which are pivotally mounted upon a sleeve 19. This sleeve has an opening through which the spindle extends, and is preferably a cylindrical member having slots 20 which permit movement of the jaws 18 in a radial direction. There are preferably four of the jaw members 18 in this set.

The spindle 17 is free to move axially within the sleeve 19 and is also free to move within the block 15. This block has tapered or conical ends 21, which force the jaw members outwardly against the inner surface of the pipe, whenever the member 17 is moved outwardly and axially, while the sleeve 19 is being held against the end of the pipe. Thus, a rigid connection can be made with the pipe in an expeditious manner, without marring the exterior surface. Moreover, by constructing the jaw members 18 with a predetermined length, then the pipe can be gripped by such members at points directly beneath the annual grove. This strengthens the pipe in the cutting region and assures a more efficient cutting operation.

The sleeve 19 supports a casing 25. It also supports a gear 26 and a coacting pinion 27. The gear is attached to the cutter support in such manner as to permit a revolving action of the cutters around the pipe merely by rotation of the pinion. To this end, a crank 28 may be attached to an extension of the pinion shaft 29 for enabling the cutting operation to be made from an advantageous position.

In practice. I employ two cutters 30 which are diametrically opposed and are each mounted in a carriage 31, which is arranged to be moved radially within a guideway 32. These guideways may be cast integrally with a ring 33, which in turn is shown as being rigidly connected by securing members 34 to the gear 26. This ring member is rotatively mounted upon the sleeve 19, and is therefore free to move with relation to the pipe and the casing 25. To this end, the sleeve 19 may have a peripheral flange 19$^a$ which is arranged to engage the end of the largest size pipe so as to position the cutters at the proper points on the pipe, without binding the ring member 33 between the pipe and casing 25. With pipes of smaller size than that shown, the ends of the pipe will engage the inner vertical face of the sleeve.

To advance the cutters radially, I have shown each carriage as having a threaded opening which is arranged to be engaged by a threaded spindle 35. The spindle may be rotated by means of a hand wheel 36 which is mounted on the outer end of the spindle, while a lug 37, forming part of the ring member, supports the spindle.

Each cutter may be held in place upon a carriage by means of a cap plate 38 which is shown as being clamped to the carriage by a securing member 39.

To limit the cutting depth upon a pipe, I prefer to provide spaced notches 40 on one side of each carriage, and to use a spring pressed plunger 46 which extends through the side of one of the guideways for engaging the notches. By having the cutters set to just clear the pipe when the nose of the plunger is against the radial face of one of the notches, then if the cutting operation is continued, until the plunger engages the radial face of the succeeding notch, it is possible to gauge the depth of the cutting without requiring the operator to stop the cutting operation and to gauge the work. A thumb plate 47 mounted on the end of the plunger enables one to hold the plunger out of engagement with the carriage while making an adjustment of the cutter.

To use a machine embodying my invention, it is only necessary to insert the clamping jaws into the end of the pipe which previously has been clamped within a vise. The jaws are moved inwardly until the end of the sleeve 19 engages the end of the pipe, and then while the operator holds the casing 25 with one hand, he can tighten the nut 48 upon the threaded end of the spindle 17. This moves the jaw members 16 toward the jaw members 18 and then spreads them thereby to spread apart as soon as they have been engaged by the conical ends of the block 15. It is obvious that continued tightening of the nut will effect a rigid connection with the pipe upon the inner surface thereof. If the cutters have previously been inserted within the holders, then each carriage may be adjusted until the nose of the plunger 46 is against one of the radial walls of the coacting notch. Thereupon the tool may be advanced until the cutting edge engages the outer surface of the pipe, and then it may be clamped to the carriage by tightening the member 39. This procedure is followed with both cutters. The plunger is then pulled outwardly from engagement with the associated notch, and the carriage is adjusted by turning the wheel 36 sufficiently far to permit the nose of the plunger to clear the radial surface of the notch. Ordinarily a slight movement of the wheel 36 is sufficient to accomplish this purpose. After each cutter has been so moved, then the operator may turn the crank 28 until it turns freely, whereupon each wheel 36 is turned slightly and the crank is again rotated. This procedure is followed until the plunger strikes the radial face of the notch in which it is traveling, and at such time the cutting operation may be stopped, if depth desired is equal to the distance between the radial faces of adjacent notches. The cutters may then be withdrawn from the grooves by reversing the direction of rotation of each hand wheel 36, while the nut 48 may be loosened to permit withdrawal of the machine from the pipe.

A machine made in accordance with my invention is advantageous in that it permits the cutting of annular grooves upon a pipe with a hand tool of simple and compact construction. Moreover by the use of reduction gearing one can make an effective cut without requiring extraordinary muscular effort.

I claim:

1. In a machine for grooving pipe, the combination of a support, means on the support engaging the interior of the pipe for clamping the support in place, said support having means to abut the end of the pipe, an external gear surrounding the support and rotatable thereon, means on the support preventing the gear shifting longitudinally, a driving pinion engaging the gear, a ring rotatably mounted on the support and rigidly fastened to the gear, a cutter, and means carried by the ring for supporting the cutter and for feeding it radially inward into engagement with the exterior of the pipe.

2. In a machine of the character described, the combination of a support, means adapted to enter the pipe and clamp the support in place, a gear rotatable on the support beyond the end of the pipe, a cup carried by the support and overhanging the gear, a ring rotatable on the support between the gear and the end of the pipe, said ring being secured to the gear and the cup substantially abutting the ring to enclose the gear, a guideway on the ring, and a cutter movably mounted in said guideway and adapted to engage the pipe at a definite distance from the end thereof.

3. In a machine of the character described, the combination of a support, means adapted to enter the pipe and clamp the support in place, a gear rotatable on the support beyond the end of the pipe, a cup carried stationarily by the support and overhanging the gear, a ring rotatable on the support between the gear and the end of the pipe, said ring being secured to the gear and the cup substantially abutting the ring adjacent to the outer edge thereof to enclose the gear, a pinion within the cup meshing with the gear, a shaft for said pinion in a bearing carried by the cup, and a cutter mounted on said ring and adapted to engage the pipe.

4. In a device of the character described, the combination of a support provided with a movable clamp adapted to engage the interior of a pipe, a ring rotatable on the support beyond the end of the pipe, means for rotating it, a radial guideway on the ring, a block slidable within said guideway, said block having ratchet teeth, a pawl adapted to coact with said teeth, and means to move the block to a variable definite position determined by the pawl, and a cutter carried by the block.

5. In a device of the character described, the combination of a support provided with a movable clamp adapted to engage the interior of a pipe, a ring rotatable on the support beyond the end of the pipe, a radial guideway on the ring, a block slidable within said guideway, said block having ratchet teeth, a pawl adapted to coact with said teeth and provided with means whereby it may be withdrawn, and a screw rotatably mounted on the ring and threaded in the block, and a cutter carried by the block.

6. In a device of the character described, the combination of a support, a ring rotatable thereon, a cutter carried by the ring and adapted to engage the pipe, means for operating the ring, a slidable rod located centrally of the support, pivoted jaws carried by the inner end of the support, pivoted jaws carried by the inner end of the rod, and a sleeve loosely mounted on the rod between the two sets of jaws and bearing against them and adapted to distribute outward movement thereto when the rod is drawn longitudinally.

7. In a device of the character described, the combination of a support, a ring rotatable thereon, a cutter carried by the ring and adapted to engage the pipe, gearing carried by the support for operating the ring, a rod located centrally of the support and slidable therethrough and having a threaded outer portion, a nut on such threaded portion of the rod abutting the end of the support, whereby the rod may be drawn toward the support, pivoted jaws carried by the inner end of the support, and projecting away from it, pivoted jaws carried by the inner end of the rod and projecting toward the support, and a sleeve loosely mounted on the rod between the two sets of jaws and bearing against them.

In testimony whereof, I hereunto affix my signature.

IRA W. NONNEMAN.